United States Patent
Chen et al.

(10) Patent No.: US 9,344,478 B2
(45) Date of Patent: May 17, 2016

(54) METHOD AND APPARATUS FOR MANAGING CONTENT DISTRIBUTION OVER MULTIPLE TERMINAL DEVICES IN COLLABORATIVE MEDIA SYSTEM

(75) Inventors: Jian Feng Chen, Beijing (CN); Ning Liao, Beijing (CN); Xiao Jun Ma, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 362 days.

(21) Appl. No.: 13/991,283

(22) PCT Filed: Dec. 7, 2010

(86) PCT No.: PCT/CN2010/001979
§ 371 (c)(1),
(2), (4) Date: Jun. 3, 2013

(87) PCT Pub. No.: WO2012/075601
PCT Pub. Date: Jun. 14, 2012

(65) Prior Publication Data
US 2013/0262554 A1    Oct. 3, 2013

(51) Int. Cl.
*G06F 15/16* (2006.01)
*H04L 29/06* (2006.01)
(Continued)

(52) U.S. Cl.
CPC ............ *H04L 65/80* (2013.01); *H04L 65/4076* (2013.01); *H04L 65/605* (2013.01); *H04N 21/4126* (2013.01); *H04N 21/4307* (2013.01); *H04N 21/43637* (2013.01);
(Continued)

(58) Field of Classification Search
CPC ........................... H04L 65/80; H04L 65/4076
See application file for complete search history.

(56) References Cited

U.S. PATENT DOCUMENTS

| 7,676,591 B2 | 3/2010 | Chan et al. |
|---|---|---|
| 2002/0131447 A1 | 9/2002 | Krishnamurthy et al. |

(Continued)

FOREIGN PATENT DOCUMENTS

| CN | 101836436 | 9/2010 |
|---|---|---|
| JP | 2003309530 | 10/2003 |

(Continued)

OTHER PUBLICATIONS

Lim et al., "An Optimal Adaptation Framework for Transmission of Multiple Visual Objects", Journal of KIISE, vol. 35, No. 4, 2008, pp. 207-218. English Abstract.

(Continued)

*Primary Examiner* — Yves Dalencourt
(74) *Attorney, Agent, or Firm* — Myers Wolin LLC (57) ABSTRACT

A method and an apparatus for managing content distribution over multiple terminal devices in collaborative media system are provided. In the collaborative media system, a first media data is transmitted over a first channel path to a first media terminal and a second media data relevant to the first media data is transmitted over a second channel to a second media terminal. The method comprises: detecting a quality of the first media data on the first channel path and that of the second media data on the second channel path; upon detection the quality of the first media data being lower than a first predetermined value and that of the second media data being greater than a second predetermined value, transmitting the second media data over the second channel path, instead of the first media data over the first channel path, to the first media terminal (S204).

16 Claims, 5 Drawing Sheets

(51) Int. Cl.
*H04N 21/41* (2011.01)
*H04N 21/43* (2011.01)
*H04N 21/4363* (2011.01)
*H04N 21/442* (2011.01)
*H04L 12/721* (2013.01)
*H04L 12/707* (2013.01)

(52) U.S. Cl.
CPC ....... *H04N 21/44227* (2013.01); *H04L 45/123* (2013.01); *H04L 45/24* (2013.01)

(56) References Cited

U.S. PATENT DOCUMENTS

| | | |
|---|---|---|
| 2003/0101460 A1 | 5/2003 | Liu |
| 2003/0192049 A1 | 10/2003 | Schneider et al. |
| 2006/0161621 A1 | 7/2006 | Rosenberg |
| 2008/0192119 A1 | 8/2008 | Li et al. |
| 2009/0081950 A1 | 3/2009 | Matsubara et al. |
| 2010/0149306 A1 | 6/2010 | Gopal et al. |
| 2010/0268836 A1* | 10/2010 | Jabri et al. .................. 709/231 |
| 2011/0243193 A1* | 10/2011 | Nakajima .................... 375/140 |
| 2012/0246687 A1 | 9/2012 | Matsubara et al. |

FOREIGN PATENT DOCUMENTS

| | | |
|---|---|---|
| JP | 2004040604 | 2/2004 |
| JP | 2005039625 | 2/2005 |
| JP | 2006101561 | 4/2006 |
| JP | 2009080593 | 4/2009 |
| JP | 2010074487 | 4/2010 |
| WO | WO2009053401 | 4/2009 |

OTHER PUBLICATIONS

Search Report Dated Aug. 18, 2011.

* cited by examiner

METHOD AND APPARATUS FOR MANAGING CONTENT DISTRIBUTION OVER MULTIPLE TERMINAL DEVICES IN COLLABORATIVE MEDIA SYSTEM

This application claims the benefit, under 35 U.S.C. §365 of International Application PCT/CN/2010/001979, filed Dec. 7, 2010, which was published in accordance with PCT Article 21(2) on Jun. 14, 2012 in English.

TECHNICAL FIELD

The present invention generally relates to collaborative media, and in particular, to a method and an apparatus for managing content distribution over multiple terminal devices in collaborative media system.

BACKGROUND

It should be noted that this section is intended to introduce various aspects of art to the reader, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In current connected home environment, more and more terminal devices are grouped together for a collaborative media presentation. By "collaborative media", it means such media section is composed of multiple multimedia flows (e.g. video, animation, flash, music, photos, etc.) which have identical content or tight inner-relationship in both temporal and spatial sequences. For example, in a fashion show displayed on a TV screen, the content inside a region of interest selected by an end user will be presented on the screen of his/her mobile phone, with these two screens well synchronized during the whole period of program. The above case can be called a collaborative media presentation. In another example, a TV screen is divided into multiple areas for multi-view displaying for a football game—one full view for the whole stadium and one close view for an athlete from a different angle. In this case, a viewer can also transfer one part of the screen (e.g. close view for a sport star) into a personal tablet nearby while remaining the full view watching on TV screen. The same scenario can be deployed in a live broadcasting for F1 Grand Prix, a viewer can select the video flow captured by an internal camera installed on the helmet for driver's viewing experience, while enjoying the live game show simultaneously.

In the international application PCT/CN2010/000413 entitled "SCENE BASED TRICK MODE USING STORYBOOK", Li Jun et al, filed on Mar. 31, 2010, a media distribution method for the synchronization of one terminal and the other terminal in a collaborative media presentation was described. In another international application PCT/CN2010/000201 entitled "VISUAL RHYTHM BASED MULTIMEDIA DISTRIBUTION IN CONNECTED HOME", Chen Jian Feng et al, filed on Feb. 12, 2010, the transmission rate of collaborative contents with synchronization requirement was determined by the delay variation criteria depending on the visual rhythm of video content. In the above two applications, the transmission channel is regarded as reliable transmission path and packet loss seldom happens. That is, a packet loss is not considered. However, in a practical connected home environment, different kinds of access network may be deployed. For those access networks with wireless transmission such as WiFi, WiMAX or data interface by packet switch network for HSDPA (High Speed Download Packet Access), WCDMA (Wideband Code Division Multiple Access), LTE (Long Term Evolution), the packet loss is inevitable due to the error-prone characteristic of the wireless transmission channel.

In view of the above technical problem, some solutions were proposed to take the packet loss into consideration for the collaborative media. In the US patent application US2008/0192119 entitled "SYSTEM AND METHOD OF MANAGING VIDEO CONTENT", Zhi Li et al, filed on Feb. 14, 2007, a method is proposed to predict a quality of video content received at a set-top box and to determine whether the current transmission between a head end and the set-top box satisfies a performance requirement or not. The predicting method depends on the video quality model and the empirical video performance testing data, and wherein a threshold value is defined to provide an alerting when the network element does not meet the performance requirement. In the U.S. Pat. No. 7,676,591 entitled "SYSTEM AND METHOD FOR TRANSFERRING MULTIPLE DATA CHANNELS", Cheuk Chan et al, filed on Aug. 2, 2006, a method is proposed for fast playback switch between a first track and a second track. But in this patent the switch operation is triggered by an end user's transferring operation from one media source to another, instead of being determined by the internal device depending on the transmission video quality. In another U.S. Pat. No. 9,839,830 entitled "SYSTEM AND METHOD FOR WIRELESS PACEKT DATA CONTENT SWITCH", Shridhar Krishnamurthy et al, filed on Apr. 19, 2001, a content switch system extracts one or more predetermined data fields from the radio packet data, with the objective of which is to allow data to be provided to wireless devices over various networks with different protocol specifications. In this patent, there is no requirement for the service relationship in upper layer.

SUMMARY

The present invention provides a method and an apparatus for managing content distribution over multiple terminal devices in collaborative media system.

According one aspect of the invention, a method for managing content distribution in a collaborative media system is provided. In the collaborative media system, a first media data is transmitted over a first channel path to a first media terminal and a second media data relevant to the first media data is transmitted over a second channel to a second media terminal. The method comprises: detecting a quality of the first media data on the first channel path and that of the second media data on the second channel path; upon detection the quality of the first media data being lower than a first predetermined value and that of the second media data being greater than a second predetermined value, transmitting the second media data over the second channel path, instead of the first media data over the first channel path, to the first media terminal.

According another aspect of the invention, a gateway in a collaborative media system is provided, which receives a first media data and transmitted the first media data over a first channel path to a first media terminal and receives a second media data relevant to the first media data and transmitted the second media data over a second channel to a second media terminal. The gateway comprises: control means for detecting a quality of the first media data on the first channel path and that of the second media data on the second channel path and for transmitting the second media data over the second channel path, instead of the first media data over the first channel path, to the first media terminal upon detection the quality of the first media data being lower than a first predetermined value and that of the second media data being greater than a second predetermined value.

It is to be understood that more aspects and advantages of the invention will be found in the following detailed description of the present invention.

BRIEF DESCRIPTION OF THE DRAWINGS

The accompanying drawings, which are included to provide a further understanding of the, illustrate embodiments of the invention together with the description which serves to explain the principle of the invention. Therefore, the invention is not limited to the embodiments. In the drawings.

DETAILED DESCRIPTION

An embodiment of the present invention will now be described in detail in conjunction with the drawings. In the following description, some detailed descriptions of known functions and configurations may be omitted for clarity and conciseness.

Figure 1:
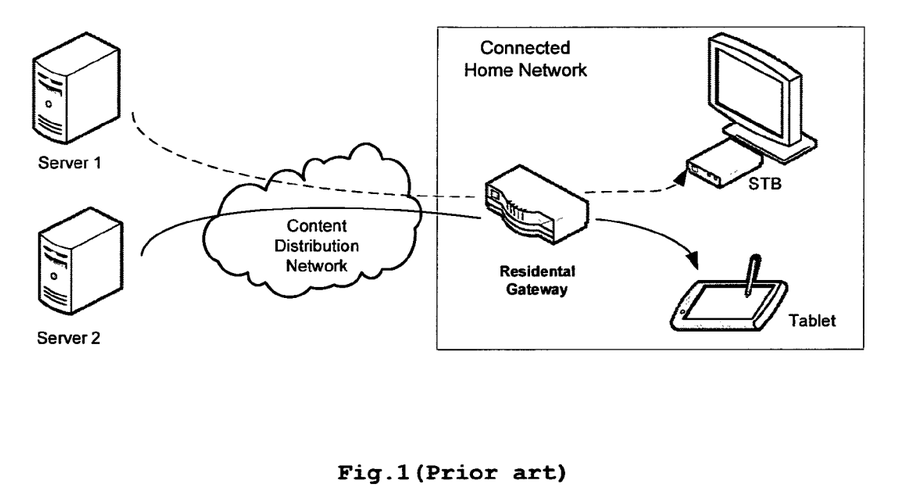
FIG. 1 is an exemplary diagram showing the structure of a connected home network according to the prior art.

FIG. 1 is an exemplary diagram showing the structure of a connected home network. As shown in FIG. 1, a set-to-box (STB) receives a first data flow of a live TV program transmitted from a server 1 over a first channel path (denoted by the dash line in the figure) of a content distribution network. A Tablet receives a second data flow of the auxiliary content of the live TV program transmitted from a server 2 over a second channel path (denoted by the solid line in the figure) of the content distribution network. For example, the above auxiliary content can be a second view from different angle of a live TV program. The first data flow and the second data flow are displayed respectively on a TV connected with the STB and the Tablet in a "synchronized" manner, which constitutes the above-mentioned collaborative media presentation. In this case, the first data flow and the second data flow can be defined as in a same collaborative media group.

As shown in FIG. 1, a residential gateway can act as a proxy of the first and second data flows to implement the centralized control function for the content distribution. The data delivered from the server 1 and the server 2 can be produced by a same content provider, such as a national or local television station. The data flows can also come from different sources. For example, the first data flow displayed on the TV screen can be received from cable, while the second data flow of the auxiliary content displayed on the Tablet can be retrieved from a $3^{rd}$ party website, as long as the first and second data flows serve for the identical program or have tight inner relationship in both temporal and spatial sequence, that is, being synchronized. The first and second data flows can be streamed from the servers 1 and 2 to the STB and the Tablet respectively. But it should be understood that the invention is not limited to data streaming.

It can be appreciated that in the process of the collaborative media distribution in the connected home environment as exemplarily shown in FIG. 1, the transmission of the first and second data flows over the first and the second channel paths may suffer various packet loss situations. Furthermore, for a streaming video content transmission, the affection of viewing experience caused by the packet loss may vary a lot due to the different compressed video packet types. Although some error resilience methods can be deployed in the application layer to recover the loss packet and reduce the affection for viewing experience caused by the packet loss, sometimes it is still difficult to provide a satisfactory result, for example, when an independent decoding frame that represents a new scene in a video sequence is lost.

For simplicity, in this application a transmission of a data flow from the residential gateway to a terminal device is supposed to be perfect. That is, there will be no quality degradation of the data transmission from the residential gateway to a terminal device. Therefore, when the content quality of a channel path is referred, actually it only depends on the quality of the transmission from a server to the residential gateway.

Considering the tight relationship of the contents of different transmission channel paths belonging to a same collaborative media group, the content transmitted in one channel path can be regarded as an active supplementary or backup content for that of another channel path. Therefore, when the content quality of one channel path degrades severely, for example, due to the packet loss of independent decoding frame, a content switch from this channel path to another channel path with better quality will be helpful to improve the video viewing experience QoE (Quality of Experience).

Based on the above finding, an embodiment of the present invention provides a method for managing content distribution belonging to a collaborative media group over multiple media terminals in a collaborative media system. In the collaborative media system, a plurality of media data belonging to a same collaborative media group are transmitted over different channel paths and displayed on different media terminals. For simplicity, the method of the embodiment will be described in the context of the connected home network shown in FIG. 1 wherein the collaborative media group comprises two media content transmitted over two channels paths to two terminals respectively. But it can be understood that the method is not limited to such a case.

Figure 2:
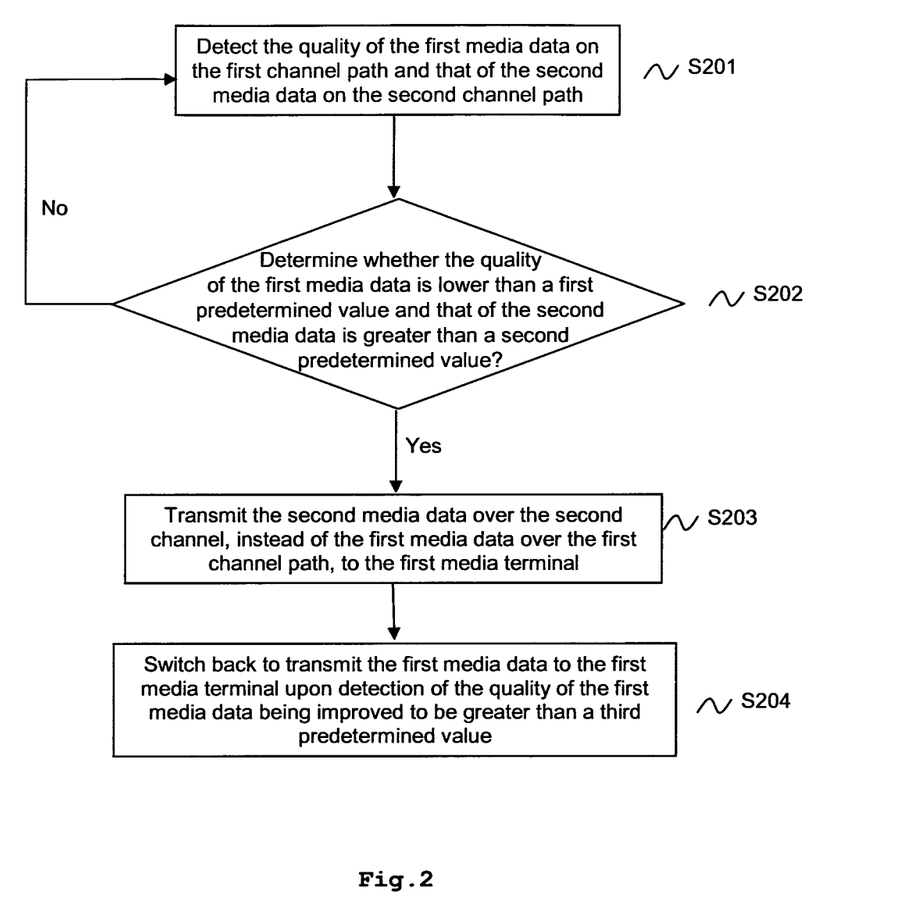
FIG. 2 is a flow chart showing the work flow of a method for managing content distribution in a collaborative media system according to an embodiment of the present invention.

FIG. 2 is a flow chart showing the work flow of the method for managing content distribution in a collaborative media system. In the collaborative media system, a first media data is transmitted over a first channel path to a first media terminal and a second media data relevant (or synchronized) to the first media data is transmitted over a second channel to a second media terminal.

As shown in FIG. 2, firstly, the procedure starts at step S201 wherein the quality of the first media data on the first channel path and that of the second media data on the second channel path are detected.

Next, at step S202, it will determine whether the quality of the first media data is lower than a first predetermined value and that of the second media data is greater than a second predetermined value.

If the result of the step S202 is "No", the procedure will return to step 201 and continue to detect the qualities of the first and second media data. If the result of the step S202 is "Yes", the procedure will proceed to step S203 wherein the second media data, instead of the first one, will be transmitted to the first media terminal.

The method can also comprise an additional step S204 wherein upon detection of the quality of the first media data being improved to be greater than a third predetermined value, the media distribution will switch back to transmit the first media data to the first media terminal.

A person skilled in the art can appreciate that the above first, second and third predetermined values will define the qualities of corresponding media data. Therefore, normally the first predetermined value should be lower than the second predetermined value and the third predetermined value should be greater than the first predetermined value.

With the above method, when the media quality of one channel path in a collaborative media system degrades to an unaccepted level, the media terminal of this channel path can switch to display the media data of the other channel path with better quality. This will be helpful to improve the video viewing experience QOE.

For a connected home network shown in FIG. 1, the above-described method is preferably implemented by a residential gateway. Next, a detailed description will be given to a residential gateway for implementing the method according to the embodiment of the invention in a connected home network with reference to FIGS. 3-5. In the residential gateway of FIG. 3, the quality of a media data flow will be detected by monitoring the packet loss status thereof over a channel path between each server and its connecting terminal.

Figure 3:
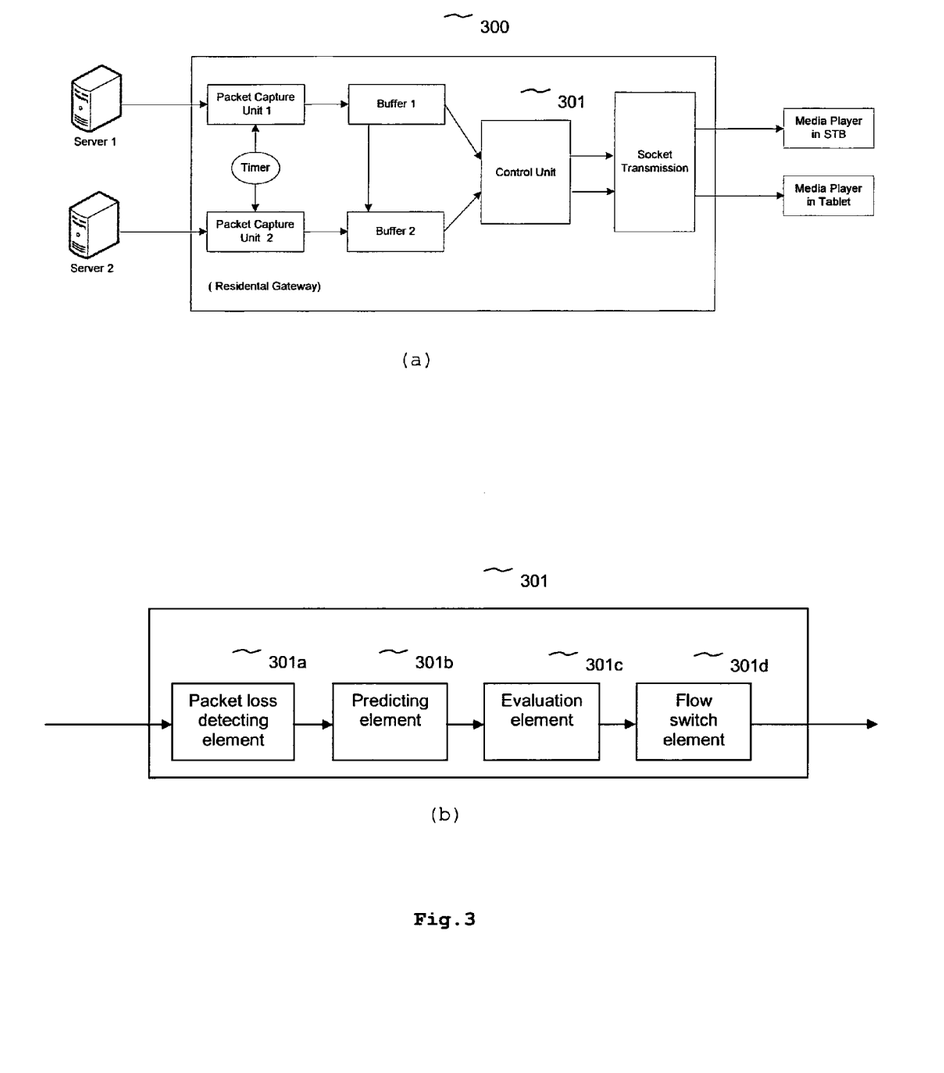
FIG. 3 is an exemplary block diagram showing the structure a residential gateway according to an embodiment of the present invention.

FIG. 3 is an exemplary block diagram showing the structure a residential gateway 300 according to an embodiment of the present invention. The residential gateway will act as a media proxy for the data flow streaming from the server 1 to a media player in the STB and that from the server 2 to a media player in the Tablet.

As shown in FIG. 3(a), the residential gateway 300 comprises a packet capturing unit 1 and a packet capturing unit 2 which respectively captures IP packets in the media data flow streaming of the server 1 and 2 from for example a network interface card (not shown) according to different filter settings composed by the protocol, such as destination port, type of service etc. Each capturing unit is used to obtain the incoming data packets that will be analyzed in the latter modules. From the given network interface, the capturing unit will cover all kinds of active web application, therefore the filters are assigned to select the targeted packets that are required for the specific application. There may exist several communication protocols for one application. For example, for a VOD (Video on demand) service, Realtime Transmission Protocol (RTP) and User Datagram Protocol (UDP) will run over Internet Protocol (IP). In this embodiment, the IP address and port of a server can be set as source address and port for the targeted video service, in order to differentiate other service packets such as email, web surfing and so on.

The residential gateway 300 also comprises a Buffer 1 and a Buffer 2 which respectively receives captured IP packets from the packet capturing units 1 and 2 and stored the received IP packets therein.

The residential gateway 300 comprises a control unit 301 for detecting the respective qualities of the IP packets stored in the buffer 1 and 2 and for determining whether to switch a data flow with quality degrading to a predetermined value to the other data flow with better quality.

As mentioned above, the quality of media data flow will be detected as a function of the packet loss status in the data flow. That is, the quality of media data flow will be evaluated based on the priority of a lost packet and the packet loss rate of the media data flow. As shown in FIG. 3(b), the control unit 301 comprises a packet loss detecting element 301a for detecting the packet loss in the media data flow. For example, the detection can be performed based on the analysis of the continuity of sequence number of the packets in respective buffer. If there is a missing of sequence number in the consecutive packets, the packet loss detecting element 301a will determine that a packet loss happens. The control unit 301 also comprises a predicting element 301b which predicts the type and priority of a lost packet upon receipt of a message from the packet loss detecting element 301a that there is a packet loss. For this prediction, one method is to decode the existing video packets to check what the missing frame or slice is in the video sequence, which however will require a heavy burden and resource consumption of the decoding work in the gateway side.

Another method is to parse the specific field in the packet stored in the buffer, such as priority of the packets, to check the importance of the lost packet. In RFC 3984 named "RTP payload format for H.264 video", there is a NAL (Network Abstract Layer) unit octet defined in the beginning of the RTP payload, in which there are 2 bits for the NAL. The semantics of value 00 and a non-zero value remains unchanged from the H.264 specification as long as the content type of the payload among the consecutive RTP packets is the same. A value of 00 indicates that the content of the NAL unit is not used to reconstruct reference pictures, while value of 11 indicates the video packet may include important information such as sequence parameter set or a picture parameter set, or the video packet is an instantaneous decoding refresh (IDR) unit which is the reference for the other video packet.

| 0 | 1 | 2 | 3 | 4 | 5 | 6 | 7 |
|---|---|---|---|---|---|---|---|
| F | NRI | | | TYPE | | | |

In RFC2250 for RTP Payload Format for MPEG1/MPEG2 Video, there is a MPEG Video-specific header attached to each RTP packet after the RTP fixed header, as shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  MBZ  |T|         TR        | |N|S|B|E|  P  | |BFC| | |FFC|
+-+-+-+-+-+-+-+-+-+-+-+-+-+-+-+-+-+-+-+-+-+-+-+-+-+-+-+-+-+-+-+-+
```

In the header, the P field is for Picture-Type (3 bits), that is, I (1), P (2), B (3) or D (4). This value is constant for each RTP packet of a given picture. The I frame will have the highest priority, and the B/D frame has the lowest priority. Based on this RFC definition, the predicting element 301b of the control unit 301 can detect the priority of a video packet for the media quality by parsing the specific filed in the RTP payload, which will reduce the overhead of video content decoding at the gateway side. The priority of the loss packet can only be predicted by the observation of the existing received packets, including the neighboring packets with the closest variation of the sequence number. Therefore, the corresponding priority value in these neighboring packets will provide enough reference information to predict the priority type of the lost packets. The information from the nearest two packets (one before and one after) around the lost packet will be used. The priority histroy of the previous packets may provide some additional reference information of the periodically IDR unit or I frame emerging, by which a matching process can be done to determine the possible type of the lost packet.

The control unit 301 also comprises an evaluation element 301c for evaluating the quality of media data of the two media flows based on the packet loss status input from the predicting element 301b. For example, if there is a packet loss in a media flow and the lost packet covers a high priority independent decoding video packet, the media quality will be evaluated as lower than that of a media flow which has no packet loss or has packet loss in low priority video frame. Additionally, the predicting element 301b can also predict a packet loss rate of a media data flow. If although no priority packet in the media flow is lost while the packet loss rate exceeds a predetermined level, the media quality will also be evaluated as lower than that of a media flow with no priority packet loss and lower packet loss rate. An evaluation result can be expressed or indicated in any appropriate manner known in this art, which will be not described in the invention.

The control unit 301 comprises a flow switch element 301d which operates according to the evaluation result of the evaluation element 301c. More specifically, if the quality of one media flow is evaluated as degrading to be lower than a certain value while at the same time the quality of the other media flow is evaluated as remaining better to be higher than a certain value, the flow switch element 301d will switch the media flow with lower quality value to the other media flow with higher quality value. As shown in FIG. 3, the media flow will be transmitted by socket transmission to corresponding media terminals.

For example, if one or more high priority packets are lost in the media flow of the Buffer 2, a flow switch process will be carried out as long as there is no packet loss or low priority packet loss occurred in the other media flow of the Buffer 1. If there is also a high priority packet loss in the media flow of the Buffer 1, the switch will not be executed.

Figure 4:
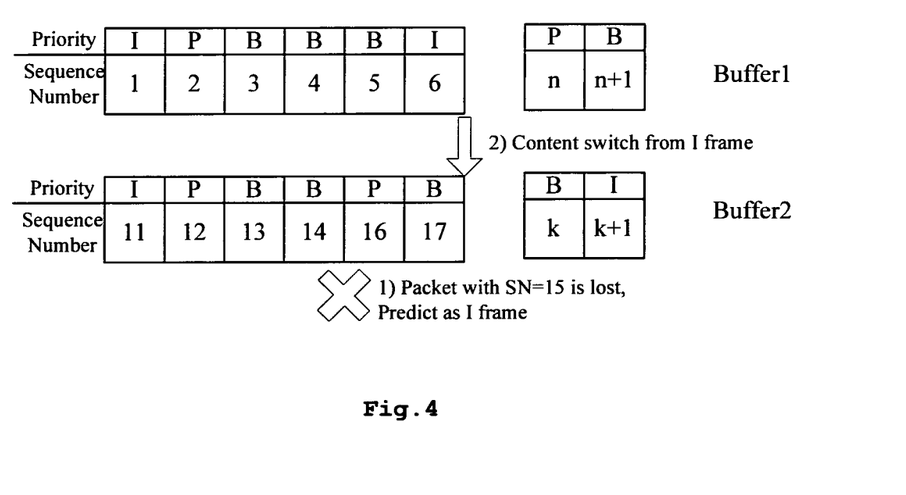
FIG. 4 is an exemplary diagram showing an example of a switch from Buffer 2 to Buffer 1 of the residential gateway shown in FIG. 3.

Preferably, the flow switch element 301d will switch the media flow from the next independent decoding frame in order to prevent a mosaic during displaying the media flow in the media player of the media terminal. For example, the switch point can be selected in I frame or IDR unit. FIG. 4 is an exemplary diagram showing an example of a switch from Buffer 2 to Buffer 1 of the residential gateway shown in FIG. 3. As shown in FIG. 4, the system that packet with SN=15 in Buffer 2 is lost. The control unit 301 detected this packet loss according to the sequence number comparison and predicted that the loss packet covers the I frame based on the orderliness of the frame priority sequence because in the previous history, there is always I frame existing after B frame and before P frame. Additionally, if the control unit 301 determines that there is no packet loss occurred in Buffer 1, the packets (or the payload the packet) in Buffer 2 will be replace by the corresponding content in the Buffer 1 from the next I frame of the Buffer 1 (the packet with SN=6 in this case). For another embodiment, the following table includes a more general predicting judgment result with only two priority levels (high/low) when a single packet loss happens. If there are more priority levels existing or more than one packet loss happen, other probability prediction method can be deployed.

| | Previous Packet | Lost Packet | Subsequent Packet | Predict Result |
|---|---|---|---|---|
| Sequence number | N − 1 | N | N + 1 | |
| Priority field | High | | High | High |
| | High | | Low | 50% High, 50% Low |
| | Low | | Low | Low |
| | Low | | High | 50% High, 50% Low |

Furthermore, when the evaluation element 301c shows that the quality of above-described media flow with lower quality value is improved to be higher than a certain value, the flow switch element 301d can switch back to transmit the initial media flow to the corresponding media terminal. It can be appreciated by a person skilled in the art that, this switch back process could also be carried out from the next independent decoding frame in view of the mosaic issue.

It can be appreciated by a person skilled in the art that it is also possible to use other methods for media quality evaluation.

Additionally, as mentioned above, with regarding to the media quality, the residential gateway 300 only considers the channel path between it and a server and supposes the transmission from it to a terminal device is perfect. It can be appreciated by a person skilled in the art that whether the channel path from the residential gateway to a terminal device could be decided based on the practical context where the invention is used.

Figure 5:
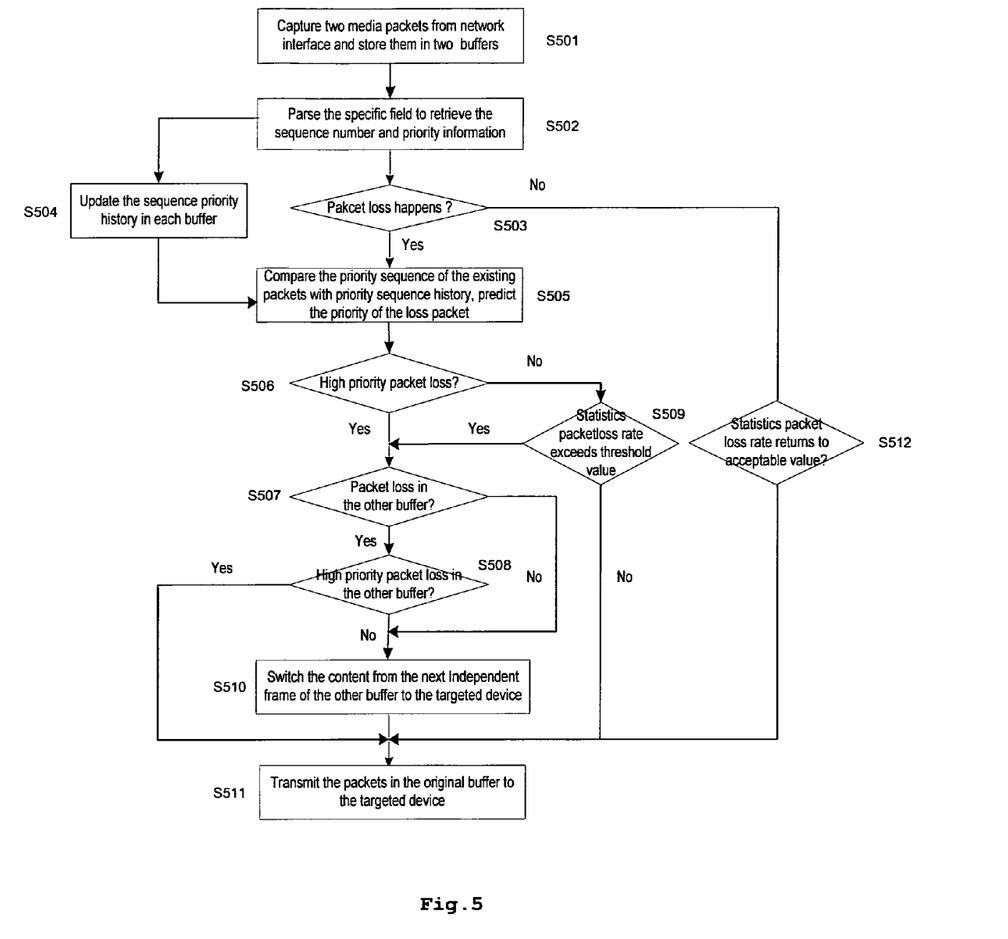
FIG. 5 is a flow chart showing the media flow switch from Buffer 2 to Buffer 1 shown in FIG. 4 carried out by the residential gateway 300 shown in FIG. 3.

FIG. 5 is a flow chart showing the media flow switch from Buffer 2 to Buffer 1 shown in FIG. 4 carried out by the residential gateway 300 shown in FIG. 3.

As shown in FIG. 5, at step S501, for each media flow, packets will be captured from the network interface and stored in respective buffers, that is, Buffers 1 and 2.

At step S502, a specific field of a packet in a buffer will be parsed to retrieve the sequence number of the packet and its priority information.

Next, at step S503, a determination will be made on whether packet loss happens in one buffer, the Buffer 2 in this case.

As shown in FIG. 5, following the step S502, there is also a step S504 wherein the sequence priority history is updated in each buffer.

If the result of the step S503 is "Yes", at the following step S505, the priority of the lost packet will be predicted by comparing the priority sequence of the existing packets with priority sequence history obtained from the step S504.

Then at the following step S506, a determination will be made on whether the lost packet has high priority.

If the result of the step S506 is "Yes", at the following step S504, there are also determinations in steps S507 and S508 on whether there is packet loss and whether there is high priority packet loss in the other buffer, that is, the Buffer 1. If either the result of step S507 or that of S508 is "No", the content will be switched from Buffer 2 to Buffer 1 from the next Independent frame and transmitted to the display device of Buffer 2.

As shown in FIG. 5, if the result of the step S506 is "No", at step S509, it will be determined whether statistical packet loss rate of Buffer 2 exceeds a predetermined threshold value. If the result of step S509 is "Yes", the proceeding will also go to the steps S507 and S508. While if the result of step S509 is "No", no switch of content will be made, that is, the packets in the Buffer 2 will be transmitted, as original.

Also can be seen from FIG. 5, if the result of the step S506 is "No" and a determination result at step S512 shows that the statistical packet loss rate of Buffer 2 returns to a predetermined value that is acceptable, a switch back will be carried out. That is, the packets in the Buffer 2 will be transmitted again.

It is appreciated that operations to the packets in Buffers 1 and 2 can be carried out in parallel. Therefore, although the above steps are described with a specific sequence, some of them can be done simultaneously or in reverse sequence as described.

The invention is described in a case that the collaborative media group only comprises two media content transmitted over two channels paths to two terminals respectively. For a collaborative media group with more than two media content transmitted over more than two channels paths, the invention also applies.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two.

The invention claimed is:

1. A method for managing content distribution in a collaborative media system, wherein a first media data is transmitted over a first channel path to a first media terminal and a second media data relevant to the first media data is transmitted over a second channel path to a second media terminal, the method comprising:
   detecting a quality of the first media data on the first channel path and a quality of the second media data on the second channel path;
   when the quality of the first media data is lower than a first value and the quality of the second media data is greater than a second value, transmitting the second media data over the second channel path, instead of the first media data over the first channel path, to the first media terminal; and
   wherein the quality of the first media data on the first channel path the quality of the second media data on the second channel path are detected as a function of a priority level of a lost packet and a packet loss rate of each media data.

2. The method according to the claim 1, further comprising:
   when the quality of the first media data is greater than a third value, switching back to transmit the first media data over the first channel path to the first media terminal.

3. The method according to the claim 1, wherein the first value is lower than the second value.

4. The method according to the claim 2, wherein the third value is greater than the first value.

5. The method according to the claim 1, further comprising:
   determining that the quality of the first media data is lower than the first value, when the lost packet is a high priority.

6. The method according to the claim 1, further comprising:
   determining that the quality of the first media data is lower than the first value, when a packet loss rate of the first media data exceeds a threshold.

7. The method according to claim 1, further comprising:
   selecting a point for switching or switching back to prevent a mosaic display on the first media terminal.

8. The method according to claim 1, further comprising:
   detecting a packet loss in a media data;
   predicting a priority level of the packet loss and a packet loss rate of the media data;
   evaluating a quality of the media data as a function of the priority level of the packet loss and the packet loss rate of the media data; and
   switching between the first media data and the second media data in accordance with the quality of the media data.

9. A gateway in a collaborative media system, which receives a first media data and transmits the first media data over a first channel path to a first media terminal and receives a second media data relevant to the first media data and transmits the second media data over a second channel to a second media terminal, the gateway comprising:
   a processor configured to:
   detect a quality of the first media data on the first channel path and~a quality of the second media data on a second channel path;
   transmit the second media data over the second channel path, instead of the first media data over the first channel path, to the first media terminal, when the first media data is lower than a first value and the quality of the second media data is greater than a second value; and
   wherein the quality of the first media data on the first channel path and the quality of the second media data on the second channel path are a function of a priority level of a lost packet and a packet loss rate of each media data.

10. The gateway according to claim 9, further comprising:
    a switch to transmit the first media data over the first channel path to the first media terminal, when the quality of the first media data is greater than a third value.

11. The gateway according to the claim 9, wherein the first value is lower than the second value.

12. The gateway according to the claim 10, wherein the third value is greater than the first value.

13. The gateway according to claim 9, wherein the processor is further configured to:
    detect a packet loss in a media data;
    predict a priority level of the packet loss and a packet loss rate of the media data;
    evaluate a quality of the media data as a function of the priority level of the packet loss and the packet loss rate of the media data; and
    switch between the first media data and the second media data in accordance with the quality of the media data.

14. The gateway according to the claim 9, wherein the processor is further configured to determine that the quality of the first media data is lower than the first value, when the lost packet is a high priority.

15. The gateway of claim 9, wherein the processor is further configured to determine that the quality of the first media data is lower than the first value, when a packet loss rate of the first media data exceeds a threshold.

16. The gateway according to claim 9, wherein the processor is further configured to select a point for switching or switching back to prevent a mosaic display on the first media terminal.

* * * * *